United States Patent

[11] 3,591,121

| [72] | Inventor | Peter P. Parris |
| | | Costa Mesa, Calif. |
| [21] | Appl. No. | 849,989 |
| [22] | Filed | Aug. 14, 1969 |
| [45] | Patented | July 6, 1971 |
| [73] | Assignee | Tridair Industries |
| | | Redondo Beach, Calif. |

[54] CARGO PALLET
14 Claims, 9 Drawing Figs.

[52] U.S. Cl. .................................................... 248/346,
108/51, 248/361
[51] Int. Cl. ..................................................... B65d 19/38
[50] Field of Search ........................................... 248/361,
346; 108/55, 51; 52/623; 161/44

[56] References Cited
UNITED STATES PATENTS

| 3,269,076 | 8/1966 | Strand .......................... | 52/623 |
| 3,396,678 | 8/1968 | Jensen .......................... | 108/51 |
| 3,452,958 | 7/1969 | Hambleton .................... | 248/346 |

Primary Examiner—Chancellor E. Harris
Attorneys—Smyth, Roston & Pavitt, Arthur W. Fuzak and Donald G. Ellingsberg ABSTRACT: A cargo pallet including a broad panel and an edge rail extending for a substantial distance around the periphery of the panel. The edge rail includes first and second spaced flanges interconnected by a web. The edge rail receives a marginal portion of the panel, and the peripheral surface of the panel is held in spaced relationship to the web of the edge rail. The cargo pallet uses narrower face sheets.

INVENTOR:
Peter P. Parris

ATTORNEYS

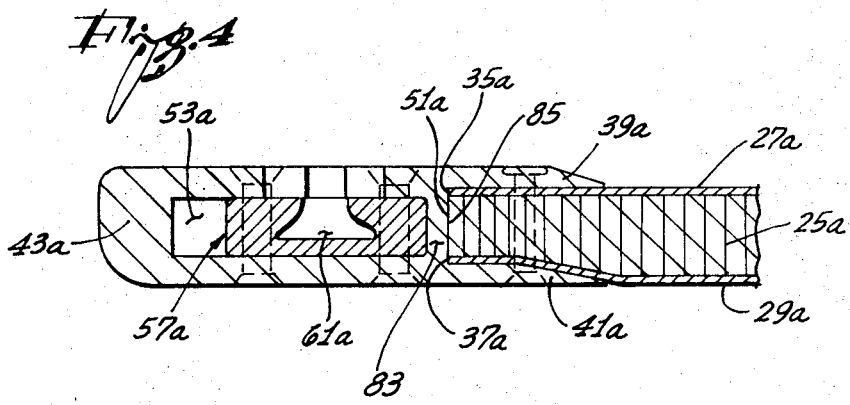
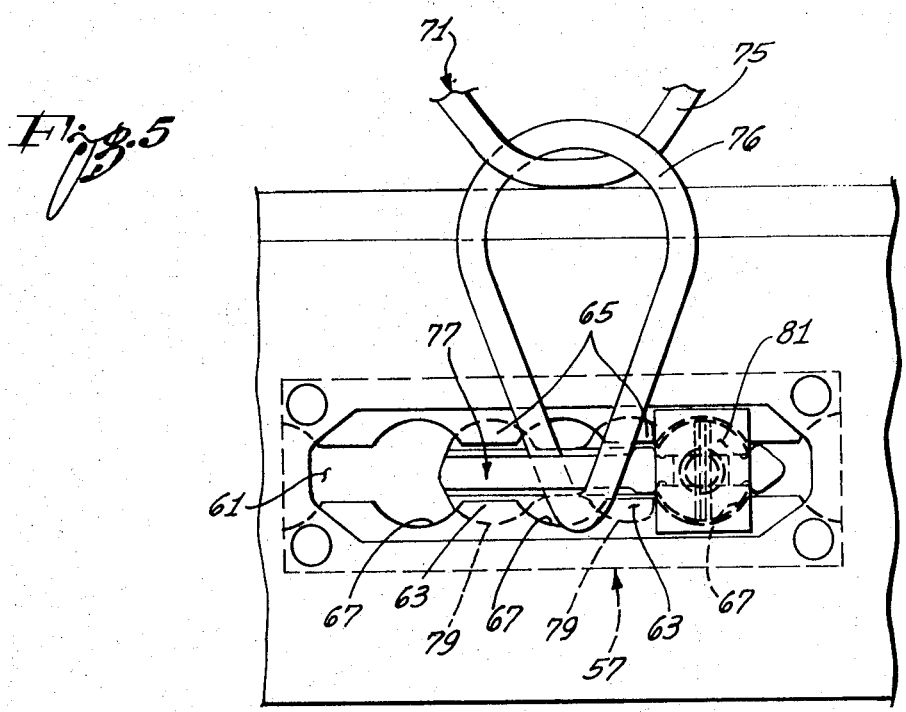

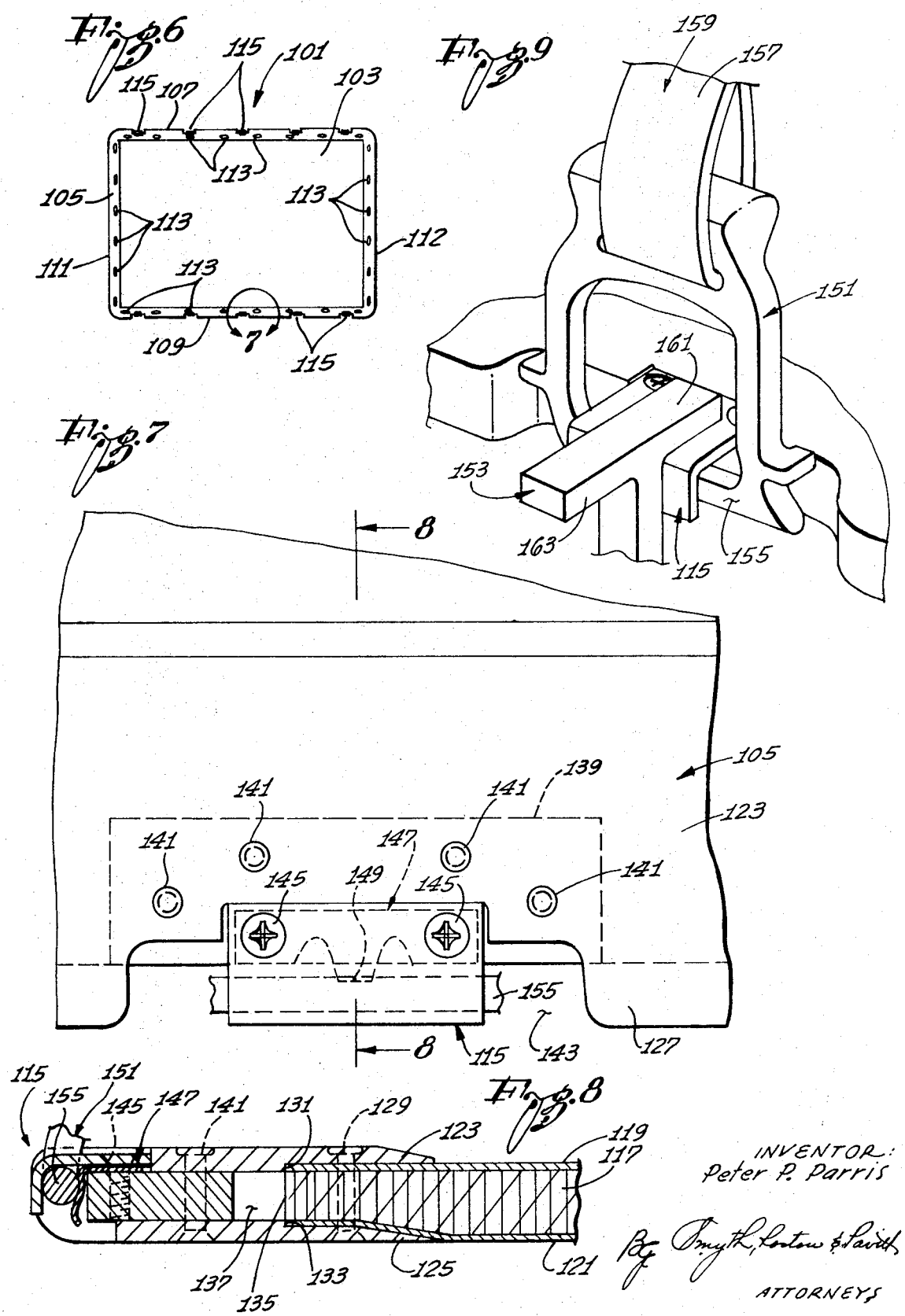

CARGO PALLET

BACKGROUND OF THE INVENTION

A cargo pallet of the type used in aircraft typically includes a panel and an edge rail mounted on the panel and extending along the periphery thereof. Cargo is placed on the pallet, and a net or other cargo-retaining means is placed over the cargo to retain the latter on the pallet. The net and rail each carry numerous fastener elements or fittings which cooperate to attach the net ends to the edge rail. In this manner the net is secured to the pallet and the cargo is firmly retained on the pallet.

One difficulty with this construction is that the panel must have a specially formed cutout area for each of the fittings which is to be mounted on the pallet. The cutout areas are necessary to provide room for the fittings. The cutting operations necessary for forming the numerous cutout areas materially increase the cost of pallet construction.

A popular panel for cargo pallets is of sandwich construction and includes a wooden core and aluminum face sheets secured to the core. A standard cargo pallet is 88 inches wide with the face sheets of the panel being 87 inches wide and with the edge rail thickness accounting for approximately one additional inch of the pallet thickness. Because aluminum sheets over 84 inches wide may cost as much as 50 cents per pound more than aluminum sheets 84 inches wide and less, it would be desirable to use the narrower face sheets to take advantage of the substantial cost savings on the aluminum. Pallet width cannot be reduced because installed aircraft cargo-handling systems are set up to handle the 88 inch-wide pallets.

SUMMARY OF THE INVENTION

The present invention provides a cargo pallet in which the expensive panel-cutting operations to form the cutouts for the pallet fittings are eliminated. The present invention also permits use of the relatively inexpensive 84-inch-wide aluminum face sheets while maintaining pallet width at the standard 88 inches.

According to the present invention an edge rail having two flanges interconnected by a web is mounted on a panel of less than standard width. The edge rail receives a marginal portion of the panel with the peripheral edge of the panel spaced from the web. As the edge rail does not receive as wide a portion of the panel as it is capable of receiving, overall pallet width is increased with the result that the pallet can be of standard width even though panel width has been reduced. Specifically, this permits use of 84-inch aluminum face sheets while maintaining pallet width at the standard 88 inches.

Another significant advantage of spacing of the peripheral surface of the panel from the web of the edge rail is that a gap is defined therebetween of sufficient size to receive the pallet fittings which are used to hold the cargo-retaining means. Alternatively, the gap may accommodate a mounting member for mounting the fitting if the fitting is to be mounted exteriorly of the pallet. In any event, machining or other special cutting operations to form the cutouts in the panel are eliminated thereby reducing the cost of production.

The price of the aluminum face sheets on a per pound basis does not vary significantly, if at all, with the length of the aluminum face sheet. Accordingly, the edge rail and panel construction along the transverse edges of the pallet may be conventional. However, this would add to the fabrication cost in that the fitting cutouts would have to be cut in the panel. Accordingly, it is preferred to use the edge rail and panel construction of this invention completely around the pallet.

The cost savings achieved by the present invention as a result of utilizing the narrower aluminum face sheets would be realized even if the core of a sandwich panel extended beyond the face sheets into engagement with the web of the edge rail so that no gap is provided. If this were done, however, the cutting of the cutouts for the fittings in the panel would be necessary. Accordingly, it is preferred to terminate the core of the panel short of the web of the edge rail so that a gap for the fittings or fitting mounting members is inherently provided. This also conserves core material.

It is important that end loads on the edge rail be transmitted directly to the face sheets of the panel. The edge rail is preferably attached with fasteners such as rivets to the panel. The apertures through the face sheets for these fasteners do not provide sufficient bearing area for the transmission of any significant end loads to the face sheets. Accordingly, the present invention provides an abutment on the edge rail for each of the face sheets. Preferably, the abutment extends for a substantial distance along the edge rail and engages the end edge of the face sheets for transmitting end impact loads thereto. Although the length of the abutments can be varied, for optimum load distribution, the abutments are preferably quite long.

In one form of the invention, each of the abutments is in the form of a shoulder on the inner face of a flange of the edge rail. In another form of the invention, the abutment is in the form of a web extending between the flanges.

The gap provided within the edge rail can be utilized to accommodate fittings of different construction. For example, in one instance the fitting is mounted within the gap on the edge rail and a portion of the edge rail is cut away to expose the fitting. In another instance, a fitting mounting member is mounted within the gap and a portion of the edge rail is cut away to expose the mounting member. The fitting is then mounted on the mounting member and projects on the exterior of the pallet. Another feature of this invention is the provision of a spring member for cooperating with this last-mentioned fitting to releasably retain a cooperating net fitting therein.

The invention, both as to its organization and method of operation together with further features and advantages thereof may best be understood by reference to the following description taken in connection with the accompanying illustrative drawings.

BRIEF DESCRIPTION OF THE DRAWINGS

FIG. 4 is a sectional view similar to FIG. 3 illustrating a second form of edge rail construction.

FIG. 5 is a fragmentary plan view similar to FIG. 2 with a net fitting releasably mounted therein.

FIG. 6 is a plan view of a second form of pallet constructed in accordance with the teachings of this invention.

FIG. 7 is an enlarged fragmentary plan view of the portion of FIG. 6 generally designated by the arrows 7 and showing another type of pallet fitting.

FIG. 8 is an enlarged fragmentary sectional view taken along line 8-8 of FIG. 7.

FIG. 9 is a fragmentary perspective view illustrating the pallet of FIG. 6 in actual use.

DESCRIPTION OF THE PREFERRED EMBODIMENTS

Figure 1:
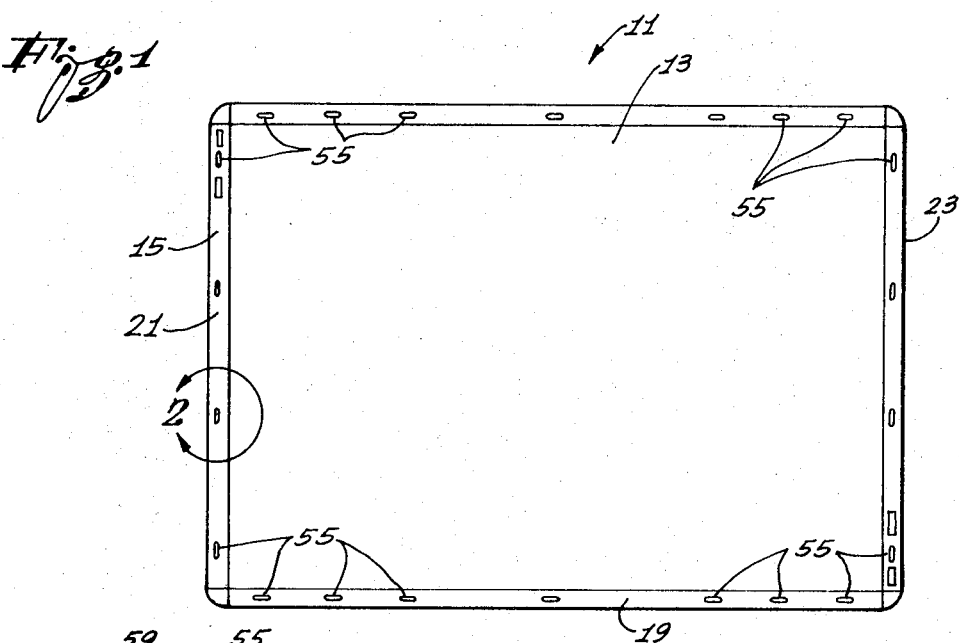
FIG. 1 is a plan view of a cargo pallet constructed in accordance with the teachings of this invention.

Referring to the drawings and in particular to FIG. 1 thereof, reference numeral 11 designates a cargo pallet constructed in accordance with the teachings of this invention. Generally the cargo pallet 11 includes a broad panel 13 and an edge rail 15 extending completely around the periphery of the panel. The pallet 11 has longitudinal edges 17 and 19 and transverse edges 21 and 23.

Figure 3:
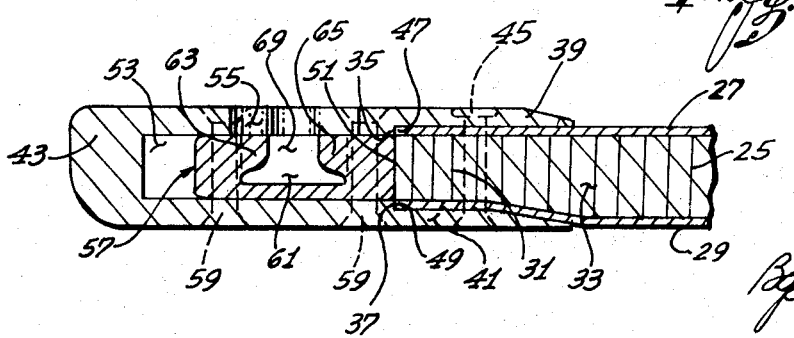
FIG. 3 is a fragmentary sectional view taken along line 3-3 of FIG. 2.

As best seen in FIG. 3, the panel 13 is preferably a sandwich panel and includes a core 25 having face sheets 27 and 29 adhered thereto as by bonding. The core 25 may be constructed of various material such as balsa wood or plywood with end grain balsa wood being preferred. With end grain balsa, the grain of the wood extends generally transverse to the face sheets 27 and 29 to improve the compressive strength of the panel 13. In the embodiment illustrated, the face sheets 27 and 29 are constructed of aluminum sheet material although other materials may be utilized. Although the core 25 may project beyond the face sheets 27 and 29, in the embodiment illustrated, the core and face sheets are coextensive with the face sheets 27 and 29 being substantially parallel over a major portion of the area thereof.

A marginal portion of the core 25 has been compressed to form a compressed section 31 with the compressed section being interconnected by a tapered transition section 33 to the main portion of the core. The compressed section 31 has been compressed beyond the crushing proportional limit thereof, but less than the amount at which the core would completely fail structurally. The crushing of the core 25 may be carried out in the manner described fully in common assignee's copending application Ser. No. 632,714. In the embodiment illustrated, the compression of the compressed section 31 results in an indentation of the lower surface of the panel whereas the upper surface of the panel 13 remains substantially planar. If desired, the compression of the compressed section 31 could result in an indentation of both of the faces of the panel 13. In the embodiment illustrated, the compressed section 31 extends all the way around the panel 13. The face sheets 27 and 29 terminate in end edges 35 and 37, respectively.

The edge rail 15 may comprise several edge rail sections, and the cross section shown in FIG. 3 is typical for the edge rail. The edge rail 15 includes flanges 39 and 41 interconnected by a web 43. The edge rail 15 is connected to the panel 13 by a plurality of releasable fasteners 45 which extend between the flanges 39 and 41 and completely through the panel 13 at the compressed section 31 thereof. The releasable fasteners 45 permit removal of the edge rail 15 and subsequent utilization thereof with a new panel 13 should the original panel become damaged. The amount of the indentation of the compressed section 31 and the transition section 33 approximates the thickness of the flange 41 adjacent such sections of the panel so that the lower face of the panel is substantially smooth and planar. This materially facilitates movement of the panel over a low friction conveying surface such as rollers. In the embodiment illustrated, the flange 39 lies above the plane of the face sheet 27; however, by indenting of the upper face of the panel 13, the entire upper face of the pallet could be made completely planar also.

Each of the flanges 39 and 41 has a relatively thick section extending outwardly from the web 43 and a relatively thin section embracing a marginal portion of the panel 13. The junctures of these thin and thick sections define abutments in the form of elongated shoulders 47 and 49, respectively. The end edges 35 and 37 abut the shoulders 47 and 49, respectively. Preferably the shoulders 47 and 49 extend throughout the full length of the edge rail 15. This provides a large bearing area between these surfaces for the purpose of transmitting end loads, i.e., those directed inwardly of the pallet in the plane of the pallet, directly to the face sheets 27 and 29. In addition, the edge rail 15 is preferably extruded and thus, the shoulders 47 and 49 can very easily extend throughout the full length of the edge rail. The edge rail may be constructed of aluminum.

In the embodiment shown in FIG. 3, the core 25 has a peripheral surface 51 which terminates inwardly of the web 43 to define a gap 53. The peripheral surface 51 contains no cutouts or notches for pallet fittings and therefore the surface 51 may be smooth and rectangular in plan. In the embodiment illustrated, the core 25 terminates at the end edges 35 and 37.

Figure 2:
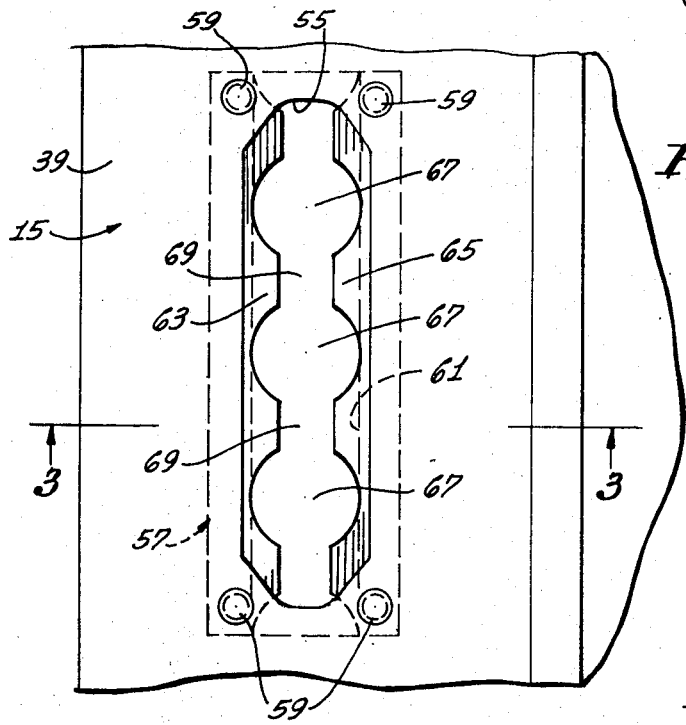
FIG. 2 is an enlarged fragmentary plan view of the portion of FIG. 1 generally indicated by the arrows 2 and showing a fitting mounted within the edge rail.

The upper flange 39 has a plurality of openings 55 spaced at predetermined intervals therealong as shown in FIG. 1. Fastener elements or fittings 57 (FIGS. 2 and 3) are housed within the edge rail 15 beneath the openings 55, respectively. Each of the fittings 57 is rigidly mounted by four fasteners 59 of suitable design which extend through the flanges 39 and 41 and through the fitting 57. As best seen in FIG. 2, the opening 55 is sized to expose a substantial portion of the fitting 57.

Although the fitting 57 may be of various designs, in the embodiment illustrated, it is in the form of a section of seat track. Specifically, the fitting 57 is formed with a longitudinally extending groove 61 which extends throughout the full length of the fitting. The groove 61 is partially covered by opposed flanges 63 and 65 of irregular contour in plan. The flanges 63 and 65 are configured to define three circular openings 67 leading to the groove 61 with adjacent pairs of the circular openings being interconnected by narrow slot portions 69.

A typical use of the fitting 57 is illustrated in FIG. 5. To retain cargo on the upper surface of the pallet 11, cargo-restraining means in the form of a net 71 (FIG. 5) is utilized. The net 71, which may be of conventional design, includes a plurality of straps 75 (only one being shown) with securing rings 76 mounted at the end of some of the vertical straps 75 of the net. The securing ring 76 is of somewhat twisted configuration as shown in FIG. 5. A tie down fitting or fastener 77 is mounted on the securing ring 76 and is lockingly received in the fitting 57.

The fitting 77 includes a pair of circular flanges 79 sized and spaced so as to be receivable simultaneously within an adjacent pair of the circular openings 67. The fitting 77 also includes a plunger 81 movable along a path generally perpendicular to the plane of the pallet 11 and spring biased downwardly. By manually raising the plunger 81, it cannot interfere with the insertion of the circular flanges 79 through the openings 67 and into the groove 61.

Then the entire fitting 77 can be slid longitudinally relative to the fitting 57 until the flanges 79 lie beneath the extended portions of the flanges 63 and 65 as shown in FIG. 5. In this portion the flanges 63 and 65 and the flanges 79 cooperate to prevent upward movement of the fitting 77 relative to the pallet 11. At this instance, the plunger 81 is released and the spring urges the same downwardly into one of the circular openings 67 also as shown in FIG. 5. The plunger 81 cooperates with the circular opening 67 in which it is received to prevent longitudinal movement of the fitting 77 relative to the pallet In this fashion, the fitting 77 is releasably mounted on the fitting 57. The fitting 77 is a standard fitting and for this reason it is not shown in complete detail. One of the fittings 77 is provided for each of the fittings 57.

With the present invention, the face sheets 27 and 29 may be 84 inches wide ad therefore be obtained at a relatively low cost. The edge rail 15 may project, for example, an additional 2 inches from the peripheral surface 51 on each of the longitudinal edges of the panel 13 to thereby provide a full 88-inch-wide pallet. Edge impact loads are transmitted directly from the shoulders 47 and 49 to the end edges 35 and 37, respectively, of the face sheets 27 and 29. The resulting pallet construction has actually been found stronger than a standard pallet as measured by restraining the opposite edges of the pallet and applying a 90° upward load to the fitting 57. The panel 13 may be rectangular and the peripheral surface 51 may be totally devoid of notches or cutout areas. This is made possible by the gap 53 which serves as a space in which the fitting 57 can be mounted.

If desired, the core 25 could project beyond the end edges 35 and 37 all the way to the web 43. This could be done and a substantial cost savings realized through the use of 84-inch-wide aluminum face sheets 27 and 29. However, the core of such a pallet would have to be periodically cut to provide void spaces for containing the fittings 57.

FIG. 4 shows an alternate edge construction in which a web 83 is utilized in lieu of the shoulders 47 and 49. In other respects, the embodiment of FIG. 4 is identical to the embodiment of FIG. 3 and corresponding parts are designated by corresponding reference numerals followed by the letter a.

The web 83 has a surface 85 which defines abutments for the end edges 35a and 37a, respectively. The web 83 is preferably integral with the remainder of the edge rail 15a and can be extruded with the remainder of the edge rail. In the embodiment of FIG. 4, the gap 53a is completely confined by the web 83, the flanges 39a and 41a and the web 43a. The peripheral surface 51a of the panel 13a terminates short of the web 43a in the manner described hereinabove with reference to FIG. 3. In all other respects, the embodiment of FIG. 4 is identical to the embodiment of FIG. 3.

FIGS. 6 through 9 illustrate a pallet 101 which is constructed in accordance with the teachings of this invention. The pallet 101 includes a panel 103 which may be identical to the panel 13 and an edge rail 105 which extends substantially continuously around the periphery of the panel 103. The pallet 101 has longitudinal edges 107 and 109 and transverse edges 111 and 112.

The pallet 101 has a plurality of fittings 113 distributed along the periphery thereof. The fittings 113 and the construction of the pallet adjacent thereto may be identical to that shown in FIGS. 2 and 3 or 4. In addition, the pallet 101 is provided with fittings 115 along the edges 107 and 109 thereof.

FIGS. 7 and 8 show a typical one of the fittings 115. The panel 103 which may be identical to the panel 13 preferably includes a balsa wood core 117 and aluminum face sheets 119 and 121. The edge rail 105 which is substantially identical to the edge rail 15 includes a pair of flanges 123 and 125 integrally interconnected by a web 127. A marginal portion of the panel 103 is received within the edge rail 105 with the flanges 123 and 125 embracing the face sheets 119 and 121 as shown in FIG. 8. The edge rail 105 is mounted on the panel 103 by fasteners 129 which may be identical to the fasteners 45. The edge rail 105 has shoulders 131 and 133 which are identical to the shoulders 47 and 49 (FIG. 3) and the edge surfaces of the face sheets 119 and 121 abut the shoulders 131 and 133 with the peripheral surface 135 of the panel 103 being held in spaced relationship to the web 127 to define a gap 137.

As described thus far, the pallet 101 is substantially identical to the pallet 11. The primary differences between the pallets 11 and 101 is in the fittings 115 and the pallet construction adjacent thereto.

A mounting block 139 is positioned within the gap 137 an is affixed to the flanges 123 and 125 by a plurality of releasable fasteners 141. A portion of the flanges 123 and 125 and of the web 127 have been cut away to form an opening 143 which exposes a portion of the mounting block 139. The fitting 115 which, in the embodiment illustrated, is in the form of a strong, metal, L-shaped bracket, is mounted on the mounting block 139 by two screws 145. As shown in FIG. 8, the fitting 115 includes a horizontal portion and a depending vertical portion.

A spring retainer 147 is sandwiched between the mounting block 139 and the fitting 115 and is mounted on the mounting block by the screw 145. The retainer 147 has a resilient retainer portion 149 which lies in spaced confronting relationship to the vertical leg of the fitting 115 as shown in FIG. 8. The construction shown in FIG. 8 is typical for each of the fittings 115 and for the pallet structure adjacent such fittings.

The fittings 115 are of the 9q type and are of substantial strength. The fittings 115 are adapted to cooperate, for example, with a stirrup fitting 151 FIGS. 8 and 9) and with a locking dog 153. The stirrup 151 is of the loop type and has a lower member 155 which is received between the resilient retainer portion 149 and the fitting 115. The upper end of the fitting 151 is connected to a strap 157 of a net 159. One of the stirrup fittings 151 may be provided for each of the fittings 115. The resilient retainer portion 149 resiliently loads the lower member 155 against the fitting 115 so that even when no upward load is applied by the strap 157 to the stirrup fitting, the lower member 155 will be releasably and resiliently retained snugly against the L-shaped fitting 115 as shown in FIG. 8.

The locking dog 153 is preferably of the type which is mounted to the supporting floor structure of an aircraft. The locking dog 153 includes flanges 161 and 163 with the flange 161 overlying the horizontal portion of the fitting 115 as shown in FIG. 9 and retaining the pallet 101 against upward movement. The use of 9q type fittings and their cooperation with locking dogs and net fittings is described more fully in the Davidson U.S. Pat. No. 3,204,581.

Although illustrative embodiments of the invention have been shown and described, many changes modifications, and substitutions may be made by one having ordinary skill in the art without necessarily departing from the spirit and scope of this invention.

I CLAIM:

1. A pallet comprising:
   a broad panel having broad first and second faces and a peripheral surface;
   an edge rail extending for a substantial distance along at least one edge of said panel, said edge rail including first and second spaced flanges interconnected by a web, said flanges extending outwardly from said web and terminating in flange ends, said edge rail defining an abutment intermediate said web and said flange ends; and
   means for mounting sad edge rail on said panel with a marginal portion of said panel being received between said flanges and with the peripheral surface being engageable with said abutment, said abutment holding said peripheral surface spaced from said web whereby a gap exists between said web and said peripheral surface.

2. A pallet as defined in claim 1 including a fitting mounted within said gap, one of said flanges having an opening providing access to said fitting, said fitting including means for retaining cargo-retaining means.

3. A pallet comprising:
   a broad sandwich panel including a core having relatively broad first and second faces and first and second face sheets attached, respectively, to said first and second faces, said panel having a pair of opposite edges;
   an edge rail extending for a substantial distance along said opposite edges of said panel, said edge rail including first and second spaced flanges interconnected by a web, said flanges extending outwardly from said web and terminating in flange ends, said edge rail defining an abutment intermediate said web and said flange ends; and
   means for mounting said edge rail on said panel with a marginal portion of said panel being received between said flanges and with at least one of the face sheets being engageable with said abutment whereby edge impact loads on the edge rail are transferred directly to said one face sheet.

4. A pallet as defined in claim 3 wherein said first flange has a relatively thick portion and a relatively thin portion with the juncture between said portions defining said abutment.

5. A pallet as defined in claim 3 wherein the width of said one face sheet extending between said opposite edges is approximately 84 inches and the width of said panel extending between said opposite edges is approximately 88 inches.

6. A pallet as defined in claim 3 wherein said abutment extends for a substantial distance along said edge rail to provide substantial bearing area between said one face sheet and said abutment.

7. A pallet as defined in claim 3 wherein said panel has a peripheral surface which terminates in spaced relationship to said web to define a gap therebetween, said pallet including a fitting mounted in sad gap, one of said flanges having an opening for providing access to said fitting, said fitting including means for retaining cargo-retaining means.

8. A pallet adapted to have cargo-restraining means affixed thereto for retaining cargo on the pallet, said pallet comprising:
   a broad panel having broad first and second faces and a peripheral surface;
   an edge rail extending for a substantial distance around the periphery of said panel, said edge rail including first and second spaced flanges interconnected by a web;
   means for mounting said edge rail on said panel with a marginal portion of said panel being received between said flanges, the peripheral surface of said panel at least at a preselected region thereof being spaced from said web of said edge rail whereby a gap exists between said web and said peripheral surface;

said first flange at said preselected location having an opening therein adjacent said web;

a mounting block within said gap, said mounting block being rigidly mounted on said flanges with at least a portion thereof being exposed through said opening in said first flange; and a fastener element rigidly mounted on said mounting block, said fastener element being adapted to retain the cargo-restraining means.

9. A pallet as defined in claim 8 wherein said fastener element includes a hook, said pallet comprising spring means for releasably retaining a cooperating fastener element of said cargo-restraining means within said hook.

10. A pallet as defined in claim 9 wherein said spring includes a spring clip mounted on said mounting block.

11. A cargo pallet adapted to have cargo-restraining means affixed thereto, said pallet comprising:

a substantially continuous and solid platelike core having first and second opposed faces, a first portion of predetermined thickness and density, and a marginal compressed portion which has been permanently compressed, said marginal compressed portion having lesser thickness than said predetermined density, said marginal portion substantially circumscribing said first portion;

first and second broad face sheets secured, respectively, to the first and second generally opposed faces of said core and extending over both of said portions of said core, said first and second face sheets generally conforming to the contour of said first and second generally opposed faces, respectively, said face sheets having edge surfaces, said core and face sheets form a sandwich panel having a peripheral surface, a first portion of given thickness and density and a marginal portion having a lesser thickness and density and a marginal portion having a lesser thickness than said given thickness and a greater density than said given density;

an elongated edge rail extending for a substantial distance around the periphery of said panel, said edge rail including first and second spaced flanges interconnected by a web, said flanges extending outwardly from said web and terminating in flange ends, said rail defining first and second abutments, each of said abutments lying between said flanges and intermediate said web and said flange ends;

means for mounting said edge rail on said sandwich panel with at least a substantial segment of said marginal portion of said panel being received between said flanges and with said edge surfaces of said first and second face sheets confronting and being engageable with said first and second abutments, respectively, said peripheral surface of said sandwich panel terminating short of said web with a gap lying between the peripheral surface of the panel and the web of the edge rail;

a fitting for retaining cargo-restraining means; and means for mounting said fitting on said edge rail, at least one of said fitting and said last-mentioned means being mounted at least partially within said gap.

12. A pallet as defined in claim 11 wherein said mounting means includes a mounting block in said gap rigidly affixed to said flanges, said fitting includes a generally L-shaped hook mounted on said block, said pallet also including a spring mounted on said block for urging a fastener element against said hood.

13. A pallet as defined in claim 11 wherein said fitting is within said gap and is rigidly affixed to said flanges, said fitting having upwardly opening recesses for receiving a portion of the cargo-restraining means.

14. A pallet as defined in claim 11 wherein said core is constructed a balsa wood and said face sheets are constructed of aluminum, each of said abutments being of substantial length to provide a substantial bearing area between the edge surfaces of said face sheets and said edge rail, each of said aluminum face sheets being approximately 84 inches wide, and said pallet being approximately 88 inches wide.